UNITED STATES PATENT OFFICE.

WM. HANSFORD, OF SAN FRANCISCO, CALIFORNIA.

IMPROVED METHOD OF PRESERVING EGGS.

Specification forming part of Letters Patent No. 47,202, dated April 11, 1865.

*To all whom it may concern:*

Be it known that I, WILLIAM HANSFORD, of San Francisco, in the State of California, have invented a certain new and useful Improvement in Preserving Eggs of Domestic and other Fowls; and I hereby declare that the following is a full, clear, and exact description thereof.

Several efforts have been made to preserve eggs by coating the egg with a liquid solution which would dry and harden, among which efforts, and perhaps the most successful heretofore, are the use of copal varnish and the alcoholic solution of gum-shellac. Some serious objections exist to both of these, of which the expense is quite important. Both are liable to crack readily. The odor of the varnish may affect the flavor of the egg, while the alcohol of the shellac solution may penetrate the shell of the egg, softening and otherwise injuring it.

In my efforts toward preserving eggs I have had in view the strengthening of the shell, instead of the weakening of it, and the using of some article that would be successful in excluding the air from the interior of the egg, and not be expensive. My experiments in this direction have led me to prefer glue, as ordinarily used by cabinet-makers, or some compound or mixture of which glue forms an essential ingredient. The glue may be laid over the egg by a brush, or any other convenient means; but my plan, generally, is to hold the egg with a pair of tongs made expressly for this purpose, and to immerse the egg in the glue at a degree of temperature not high enough to materially heat the egg, or in the slightest degree injure it by heat. One or two seconds is sufficient time for the immersion, when the egg is taken out, allowed to drain until the glue ceases to drop, and then placed on the points of sharp pins or spikes purposely arranged in a board or table, and the coating left to dry. The operation may be repeated until the covering or coating of the glue has become of the desired thickness. If the eggs are intended to be kept for family use, one coating of the glue may be sufficient. For shipment or transportation, and where it is desirable to strengthen the shell of the egg, two, three, or a greater number of dippings or coatings of the egg may be needed. Though I have generally used the glue as melted or prepared by cabinet-makers, as is evident, other preparations of glue may be used.

What I claim as my invention, and desire to secure by Letters Patent, is—

The coating of eggs with glue, substantially as and for the purposes herein recited.

This specification signed this 20th day of February, 1865.

WILLIAM HANSFORD.

Witnesses:
H. F. HASTINGS,
HENRY HAIGHT.